United States Patent [19]

Bernhardt et al.

[11] Patent Number: 4,886,119

[45] Date of Patent: Dec. 12, 1989

[54] METHOD OF AND ARRANGEMENT FOR DRIVING VOLATILE IMPURITIES FROM GROUND

[75] Inventors: Bruno Bernhardt, Reutlingen-Betzingen; Anton Hessner, Reutingen; Rainer Krug, Trochtelfingen, all of Fed. Rep. of Germany

[73] Assignee: Ieg Industrie-Engineering GmbH, Reutlingen, Fed. Rep. of Germany

[21] Appl. No.: 227,894

[22] Filed: Aug. 3, 1988

[30] Foreign Application Priority Data

Aug. 25, 1987 [DE] Fed. Rep. of Germany ....... 3728299

[51] Int. Cl.$^4$ ............................................. E21B 43/00
[52] U.S. Cl. ..................... 166/267; 166/68; 166/242; 166/370
[58] Field of Search ............... 166/267, 370, 369, 306, 166/278, 242, 235, 68, 67, 371, 265, 372; 55/55, 189, 428; 405/128

[56] References Cited

U.S. PATENT DOCUMENTS

| 2,764,533 | 9/1956 | Oetjen et al. | 55/55 X |
| 2,985,238 | 5/1961 | Dixon | 166/278 X |
| 3,743,355 | 7/1973 | Blackwell et al. | 166/370 X |
| 3,980,138 | 9/1976 | Knopik | 166/372 X |
| 4,183,407 | 1/1980 | Knopik | 166/370 |
| 4,392,531 | 7/1983 | Ippolito | 166/278 |
| 4,611,950 | 9/1986 | Russomano | 405/128 |
| 4,660,639 | 4/1987 | Visser et al. | 166/267 |
| 4,730,672 | 3/1988 | Payne | 166/266 |

FOREIGN PATENT DOCUMENTS 3626145  11/1987  Fed. Rep. of Germany .

Primary Examiner—Hoang C. Dang
Attorney, Agent, or Firm—Michael J. Striker

[57] ABSTRACT

Driving of volatile impurities from a ground by mans of air is performed by aspirating an afterflow air and impurities containing gases which penetrated through a permeable wall of a shaft in a ground, at one or several locations in regions of expected high gas contents, air afterflow passages are extended to these regions for supplying the afterflow air, and an adjustable afterflow resistance is arranged in the passages for influencing a negative pressure value and a flow speed in these regions.

20 Claims, 2 Drawing Sheets

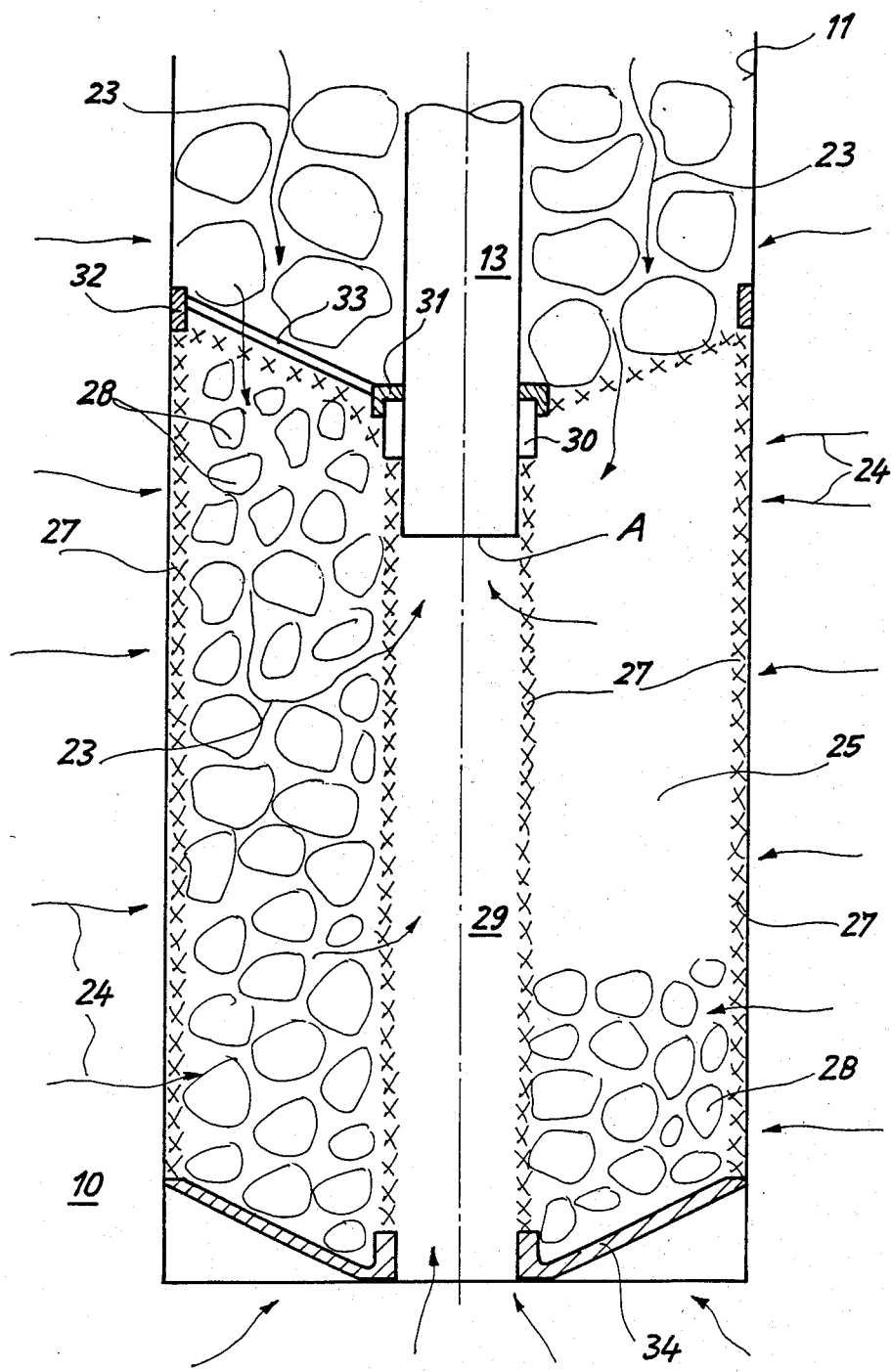

METHOD OF AND ARRANGEMENT FOR DRIVING VOLATILE IMPURITIES FROM GROUND

BACKGROUND OF THE INVENTION

The present invention relates to a method of driving volatile impurities from a ground by means of air which is aspirated together with the gases from a shaft provided in the ground with impurities and having a gas-permeable shaft wall, wherein openings for afterflow of air from outside are provided. The present invention also relates to an arrangement for driving volatile impurities from a ground by means of air.

A method of and an arrangement for driving volatile impurities from a ground of the above mentioned general type are disclosed in the German patent application P 3,626,145.9. This method and arrangement are very effective. However, it is to be understood that they can be further improved in some aspects.

Efforts have been undertaken for improving the efficiency of the method during driving of impurities of very dense and muddy soils, where the dense soil allows the afterflow of air only in a small quantity and correspondingly during the increase of the negative pressure in the shaft only an insufficient flow speed in the shaft and soil can be achieved. Physical considerations however show that the air which serves for taking the volatile impurities in gas form must have a predetermined minimum flow speed for achieving an entrainment of the impurities. An increase of the negative pressure in the suction shaft means both an increased energy consumption which puts in question the efficacy of the method, and also the grave disadvantage in that with the use of negative pressure generators, the aspirated gas/air mixture is so significantly heated that for example the aspirated chlorine hydrocarbons become unstable and can be converted in highly toxic substances.

SUMMARY OF THE INVENTION

Accordingly, it is an object of the present invention to provide a method of and an arrangement for driving volatile impurities from a ground, which avoids the disadvantages of the prior art.

In keeping with these objects and with others which will become apparent hereinafter, one feature of the present invention resides, briefly stated, in a method of and an arrangement for driving volatile impurities from a ground, in accordance with which suction in a shaft at one or several locations is concentrated in regions with expected greater gas accumulation, and air afterflow passages are extended to these regions and provided with an afterflow resistance for influencing a negative pressure value and a flow speed at these locations of the shaft.

By the concentration of the aspiration at the predetermined locations of the shaft, it is guaranteed that the afterflow air flows through the shaft to the aspiration location, and in this whole region an air flow which facilitates the taking of the gaseous impurities aspirated through the shaft wall occurs. Preferably the aspiration is concentrated at the deepest shaft location, since it has been shown that many damaging impurities have a high specific weight and therefore have the tendency to penetrate deeper into the soil in direction to the ground water. By the afterflow air it is guaranteed that the gases which penetrate in the upper shaft region in the shaft are transported to a suction location arranged at the shaft bottom.

During a simple drilling it can be first determined which resistance conditions take place in the soil layers to be purified. In correspondence with this, then the afterflow resistance for the air which flows in the produced shaft can be adjusted.

For performing the method in accordance with the present invention it is possible advantageously to use the sieve wall reinforcement of the shaft which was utilized in the German patent application P 3,626,145.9. This utilization can be performed in such a manner that the sieve wall in the selected aspiration regions is composed of a sieve ring body with an outer side abutting against the shaft wall, and an inner opening in which a non-perforated aspirating pipe with an open end is inserted. The aspiration pipe extends outwardly beyond the shaft and sealed relative to the inner side of the sieve ring. An air afterflow passage extends through the shaft and air afterflow resistance is formed by filler bodies which are provided at the end of the suction pipe, have different densities and surrounded by the sieve ring.

The afterflow resistance can also include a plurality of additional sieve rings or sieve bodies which are introduced into the shaft to surround the suction wall and which are reinforced by the filler bodies. The afterflow resistance can be influenced by the size of the selected filler bodies. An exact adjustment is guaranteed when the air afterflow resistance is influenced by an adjustable pressure regulating valve arranged in the upper shaft closure.

When the method is performed and the arrangement is designed in accordance with the present invention they provide for the advantage that always a desired inflow is available in the shaft, which is favorable for taking the gaseous impurities from the soil region surrounding the shaft. With the use of an adjustable pressure regulating valve, it is possible in condition of easily permeable soils to automatically guarantee that no or only small quantity of afterflow air is brought directly into the shaft. By the negative pressure generator, especially a ventilator, predominant or only through the easily penetratable soil pulled air brought together with the gases is moved through the shaft to the aspiration location. In each case it is however insured that the operation can be performed with a relatively low negative pressure which can be produced with an efficient energy consumption and no unpermissibly high warming of the aspirated air/gas mixture can occur.

A further important advantage of the present invention is that by means of the afterflow air and its desired inflow, a dangerous drying of the upper soil layer during aspiration can be prevented. This drying can cause damages to structure foundations and can disadvantageously damage the microbial flora.

The arrangement according to the present invention have several closed-wall aspiration pipes which are located concentrically relative to one another with a distance therebetween. Their open ends are located in different regions of the shaft and surrounded by a respective sieve ring body. Such an arrangement is advantageous in shaft which extend through several soil layers and in which one layer which is spaced from the shaft bottom has especially high concentration of impurities because of higher soil permeability. It is advantageous here when in the region of this soil layer, an additional aspiration location is provided in the shaft.

The operation of the method and arrangement in accordance with the present invention with a low negative pressure has also the advantage that from moist soils or in the event of shafts which end in ground water, the liquid cannot be transported in an easy manner. In any case, the aspiration pipe or pipes can advantageously end outside of the sealed shaft in a liquid separating chamber with a suction passage provided on the upper region of the chamber and leading to a ventilator. Separating surfaces for liquid can be formed in the liquid separating chamber for example by means of filling bodies or inner walls. The liquid can be removed periodically in an automatic or manual fashion from the liquid separating chamber. The aspirated air/gas mixture passes through a filtering device. Also, the liquid which is separated in the liquid separating chamber can be filtered in an advantageous manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view schematically showing a lower region of a shaft and suction parts in it on an enlarged scale.

DESCRIPTION OF A PREFERRED EMBODIMENT

Figure 1:
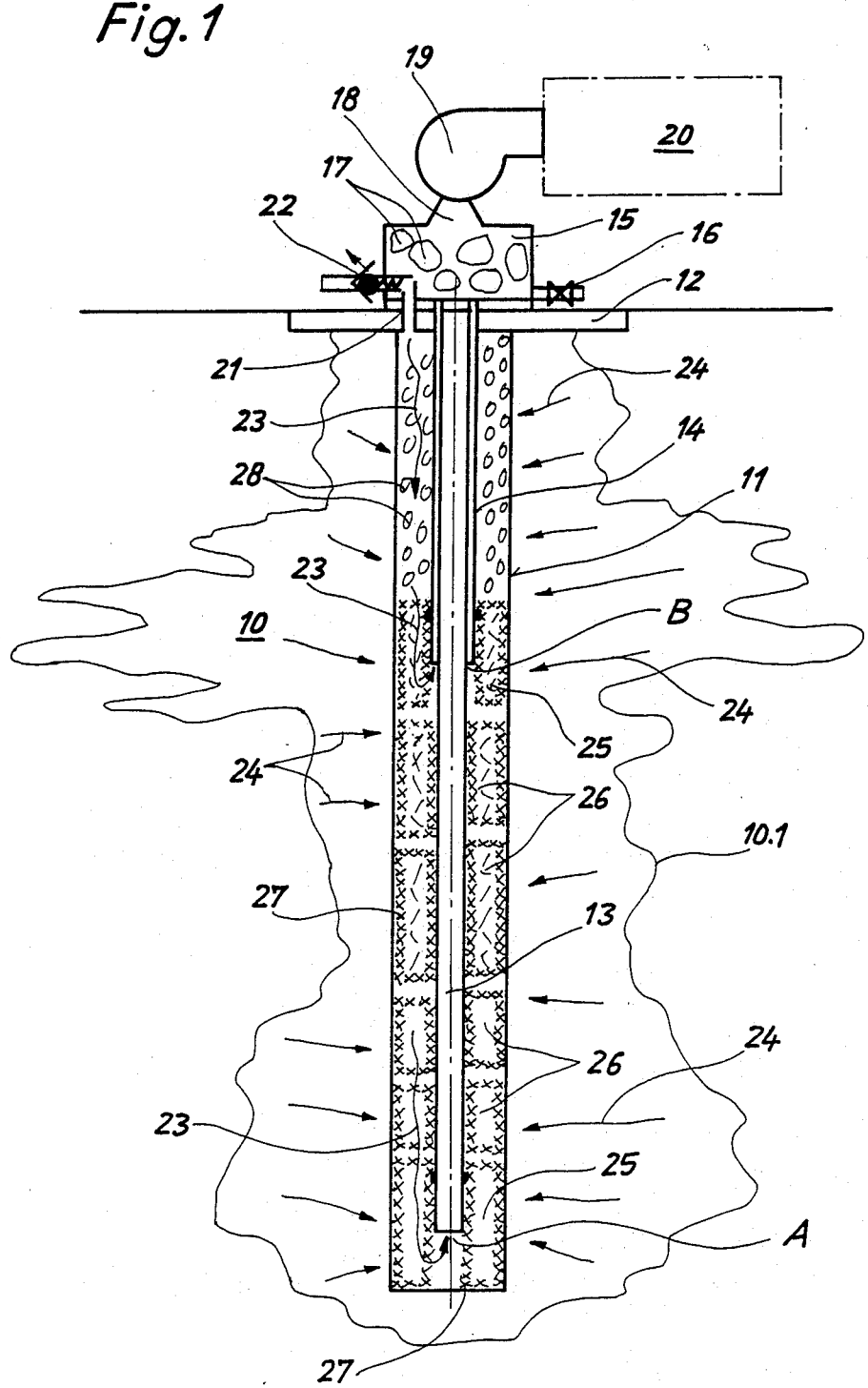
FIG. 1 is a view schematically showing a section of an arrangement for driving volatile impurities from a ground in accordance with the present invention.

FIG. 1 shows a ground 10 with impurities, and a central drilling shaft 11 extending downwardly in the ground 10. The distribution of impurities in the ground 10 is identified with points and a contour line 10.1. The drilling shaft is sealed from outside by a plate 12. A first nonperforated suction pipe 13 extends in the drilling shaft to a proximity of a shaft but. A second suction pipe 14 concentrically surrounds the first suction pipe 13 with a distance therebetween and extends exactly to a half of the drilling shaft 11. The inner ends of both pipes form suction locations A and B.

Both suction pipes 13 and 14 end outside of the shaft in a fluid separating chamber 15 which has a fluid discharge valve 16. For obtaining greater separating surfaces, filling bodies 17 are accommodated in the fluid separating chamber 15. A ventilator 19 which is used for producing a negative pressure is arranged above an opening 18 of the fluid separating chamber 15. The outlet of the ventilator 19 is connected with a filtering device 20 which is shown in dash-dot lines.

In addition to both suction pipes 13 and 14, an air supply pipe 21 extends through the closing plate 12. An adjustable pressure limiting valve 22 is arranged in the air supply pipe 21. Through the pipe 21, outer air can flow after into the shaft 11, as long as the negative pressure produced by the ventilator 19 in the shaft exceeds a threshold value which is adjusted on the pressure limiting valve 22. The so-called afterflow air supplied through the pipe 21 is identified in FIG. 1 with the arrows 23. Gases of the impurities which flow from the contaminated bottom region 10 to the shaft 11 which is under negative pressure (vacuum) are identified by the arrows 24.

Sieve ring bodies 25 are arranged at the ends of the suction pipes 13 and 14. Between both sieve ring bodies 25 further sieve ring bodies 26 are accommodated. The sieve ring bodies 25 and 26 each have a flexible sieve wall 27 which is identified in the drawings with crosses. The sieve walls can be composed of metal sieve web or synthetic plastic sieve web. The annular chamber which is enclosed by the sieve wall 27 is filled with relatively big filling bodies 28 which are shown on an enlarged scale in FIG. 2. The sieve ring bodies 25 and 26 serve in the first place for supporting the wall of the shaft 11. As can be seen from FIG. 1, the upper part of the shaft 11 is supported by inserted filling bodies 28 without sieve casings. However, here also the sieve ring bodies or the sieve rings can be used, as partially known from the German patent application P 3,626,145.9.

As can be seen from FIG. 2, the end region of the suction pipe 13 extends into an inner chamber 29 enclosed by the sieve ring bodies. The end of the suction pipe 13 forms the suction location A. The suction pipe 13 is sealed by means of a sealing ring 30 against the inner sieve wall 27 of the sieve ring body 25 for preventing flowing of the afterflow air 23 without braking along the outer side of the suction pipe 13. The sealing ring 30 is held in a centering ring 31 for the suction pipe 13. The centering ring 31 is connected with an outer reinforcing ring 32 by individual radial webs 33.

The lower end of the sieve ring body 25 is reinforced by a conical ring disc 34. This control ring disc facilitates the insertion of the sieve body into the drilling shaft 11. The filler bodies 28 which are accommodated in the interior of the sieve ring bodies 25 not only serve for reinforcing of the sieve ring bodies and supporting the wall of the shaft 11. They also form throughflow resistances for the afterflow air 23 and for the gases 24 which are taken by this air.

It will be understood that each of the elements described above, or two or more together, may also find a useful application in other types of constructions differing from the types described above.

While the invention has been illustrated and described as embodied in an arrangement for driving volatile impurities from a ground by means of air, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of driving volatile impurities from a ground with air, comprising the steps of forming in the ground a shaft with a gas permeable shaft wall; aspirating from outside of the shaft an afterflow air together with impurities containing gases; concentrating the aspiration in the shaft at a plurality of locations at different heights along the shaft in a region with expected high gas contents; extending a plurality of air afterflow passages from the earth surface through the shaft to the plurality of locations for supplying the afterflow air thereto; and providing in the air afterflow passages a plurality of afterflow resistance means, respectively, for influencing a negative pressure value and a flow speed of the afterflow air in the region with expected high gas contents.

2. A method as defined in claim 1, wherein said concentrating includes concentrating the aspiration at locations situated in the region of an lower end of the shaft.

3. An arrangement for driving volatile impurities from a ground with air, comprising a shaft having at least one region of expected great quantity of an impurity containing gas, a shaft wall, and a passage for communicating the region of expected great quantity of an impurity containing gas with atmosphere; a sieve ring to be arranged at least at one location in the region of expected great quantity of an impurity containing gas and having a sieve wall for abutting said shaft wall and an inner opening; means in the shaft for directing an afterflow air from atmosphere into the region of expected great quantity of an impurity containing gas through the passage; afterflow air resistance means to be located in the passage for influencing a negative air pressure value in the region of expected great quantity of an impurity containing gas and a flow speed of the afterflow air; means for aspirating the impurity containing gas and the afterflow air from the region of expected great quantity of an impurity containing gas, said aspirating means including a first suction pipe extending from the earth surface into the inner opening of the sieve ring and having an open end through which the impurity containing gas and the afterflow air flow; and means for sealing the lower end of said first suction pipe to an end of the inner opening of said sieve ring.

4. An arrangement as defined in claim 3, wherein said air afterflow resistance means includes at least one filler body accommodated in said sieve ring.

5. An arrangement as defined in claim 4, wherein said air afterflow resistance means further includes a filler body arranged in said air afterflow passage in addition to said first mentioned filler body accommodated in said sieve ring.

6. An arrangement as defined in claim 4, wherein said air flow resistance means further includes an additional such sieve ring which accommodates an additional such filler body and is located in said air afterflow passage.

7. An arrangement as defined in claim 3, wherein said air afterflow resistance means further includes an adjustable pressure limiting valve arranged to adjust the afterflow air.

8. An arrangement as defined in claim 7; and further comprising a shaft closure, said adjustable pressure limiting valve being inserted in said shaft closure.

9. An arrangement as defined in claim 4 wherein said aspirating means further comprises a second suction pipe with an open end extending to a different region of the shaft, said first and second suction pipes being arranged concentrically relative to one another with a distance therebetween, said air flow resistance means including a second sieve ring surrounding said open end of said second suction pipe.

10. An arrangement as defined in claim 9, wherein said afterflow resistance means further includes a plurality of additional sieve rings located between the open ends of said suction pipes and accommodating filler bodies.

11. An arrangement as defined in claim 10, wherein said filler bodies of said additional sieve rings have different densities and therefore provide different resistances to the afterflow air.

12. An arrangement as defined in claim 3; and further comprising means for separating liquid and including a liquid separating chamber arranged above said first suction pipe, said aspirating means further including a suction ventilator connected with said liquid separating chamber.

13. An arrangement as defined in claim 12; and further comprising a suction passage which connects said liquid separating chamber with said suction ventilator.

14. An arrangement as defined in claim 12, wherein said liquid separating chamber is provided with a plurality of separate surfaces.

15. An arrangement as defined in claim 14, wherein said liquid separating surfaces of said liquid separating chamber are formed by filling bodies.

16. An arrangement as defined in claim 14, wherein said liquid separating surfaces of said liquid separating chamber are formed as inner walls of said liquid separating chamber.

17. An arrangement as defined in claim 3; wherein said sieve ring has another wall such that said walls from inner and outer sieve walls, said sieve body also having two opposite ends and being provided with reinforcing elements at said both ends.

18. An arrangement as defined in claim 17; wherein said reinforcing means are formed as rings provided at said ends of said sieve body.

19. An arrangement as defined in claim 17, wherein said reinforcing means are formed as discs provided at said ends of said sieve ring body.

20. An arrangement for driving volatile impurities from a ground with air, comprising a shaft formed in the ground having means for forming a plurality of aspiration locations at different heights along said shaft in a region of expected great quantity of an impurity containing gas, said means for forming a plurality of aspiration locations extending from a location in the shaft to the earth surface; and means for forming a plurality of passages in said shaft for communicating said plurality of locations of the region of expected great quantity of an impurity containing gas with atmosphere, respectively; a plurality of afterflow air resistance means located in the plurality of passages, respectively, for influencing a negative air pressure value in the region of expected great quantity of an impurity containing gas and a flow speed of the afterflow air; and means for aspirating the impurity containing gas and the afterflow air from the region of expected great quantity of an impurity containing gas through said means for forming a plurality of aspiration locations.

* * * * *